(12) United States Patent
Hedges

(10) Patent No.: X9348
(45) Date of Patent: Feb. 3, 1836

(54) CORN SHELLING

(76) Inventor: Isaac A. Hedges

Isaac A Hedges Elmira N. York.

Letters Patent

The schedule referred to in these Letters Patent and making part of
the same containing a description in the words of the said Isaac
A Hedges himself of his improvement in the machine for shelling
corn To all to whom these presents shall come. Be it known that I
Isaac A Hedges of Elmira in the County of Tioga and State of New York have
invented a new ~~and~~ useful machine for corn shelling and that the following is
a full and exact description of the construction and operation of the said ma
chine as invented by me. A box of about two feet in height having the two
sides of timber or plank bolted to posts. and these also bolted to cross plank
which form the two ends. the sides are parallel to each other and upright the ends
incline a little towards each other being further apart at the bottom. Upon
the middle of the sides of this box are placed the ends of a horizontal iron shaft
which projects a few inches beyond each side. and is sunk into each side
about half its diameter. The shaft thus lies about two feet from the bottom
of the Box. This shaft passes through the centres of the two ends of
a cylinder of about twenty inches in length and eight in diameter. the
sides of the box being of sufficient distance apart to permit the cylinder to
revolve freely between them. To one end of this shaft is fixed a balance
wheel of iron or other material of from fifty to seventy five pounds in
weight which together with the cylinder revolves with this shaft and is
designed to give steadiness and momentum to the revolutions of the cylinder.
To one arm of this wheel about half way from its centre to its circumfer
ence is fixed a handle for the purpose of being moved by hand. The
wheel is about thirty inches in diameter. To the other extremity of
the shaft is fixed a small wheel also revolving with it about which
a strap may be passed for the purpose of connecting it with such
machinery as may be requisite for moving the cylinder by Horse. Steam
or water power. When Horse, Steam or water power is used the balance wheel may if judged necessary be disengaged from the shaft. The cylinder is formed of cast iron staves. Upon its convex surface are small protuberances of about one fourth of an inch in height arranged at moderate intervals in parallel rows at short distances from each other each row consisting of two lines as nearly straight as may be inclining towards the direction in which the cylinder revolves meeting midway between the two ends of the cylinder and forming there an angle of about one hundred and fifty degrees with each other. The iron staves which form the surface of the cylinder are secured by wrought iron bands passing round the ends of the cylinder. A concave non revolving cylindrical surface lying horizontally and having its upper edges in the same horizontal plane. This surface is of sufficient extent to cover nearly the whole of the lower half of the cylinder and when in its natural position the space between the cylinder and that edge of the surface at which the ears of corn enter in order to pass between it and the cylinder is about one and one fourth inches gradually diminishing till at the opposite edge where the cob leaves the cylinder this space is about five eighths of an inch. The spaces here mentioned are reckoned from the general surface of the cylinder to the summit of the ridges to be described in the concave surface. And these spaces may be increased or diminished in proportion to the sizes of corn in different countries. This concave surface consists of six or more rectangular staves each running the whole length of the cylinder and entering a semicircular tier of notches made in a cast iron plate which is attached by bolts to the inside of the box on each side. These two plates also assist in forming a support to the shafts of the cylinder. About one inch of the ends of each stave is turned upwards so as to pass behind the cast plate just mentioned thus preventing the kernels of corn from interfering with the springs attached to the backs of the staves. These springs may be of wood or of steel and are about three fourths of an inch broad. If of wood one spring is attached to the back of each stave by screws and extends both ways diverging a little from the stave till it enters the mortice at the end of the stave and rests on that side
of the mortice which is furthest from the cylinder. On entering the mor-
tice the space between the spring and the stave is about three fourths
of an inch. Two of these are attached, one near each end of the
stave entering the mortice in like manner. The concave surface
will thus press the ears of corn against the cylinder and at the
same time spring back more or less according to the different sizes
of the ears & at no time pressing with sufficient force to break the ker-
nels of corn. These rectangular staves which form the concave
surface are about three eighths of an inch in thickness and strengthened
by flanges affixed to each edge of the stave and running its whole length
within the end plates, meet the edges of the mortice into which the stave
enters and confines the stave to its proper place between the cast
iron side plates. Each flange is about 1/8 of an inch thick. These flan-
ges project about one eighth of an inch above that side of the stave which
is next the cylinder and about three fourths of an inch beyond the
opposite side, thus strengthening the staves and forming edges in the
concave surface. The breadth of each stave with the flanges attached is
about two inches. The staves are perforated with holes, the centres of
which are about one inch apart and sufficiently large to permit the
kernels of corn to pass through. Spaces are also left for the same pur-
pose between the several staves. These holes are made between the spring
and flange and not directly above the spring. A second box [illegible]
a hopper and cover for the upper part of the cylinder is formed in the
following manner. Two rectangular pieces of plank of about one foot in
breadth and of sufficient length to fit the upper edges of the sides of
the box before described and joined together by two pieces of board so in-
clined towards each other as to form a hopper in which to throw the ears
of corn. The opening at the lower part of this hopper is about three inch-
es in breadth and of a length nearly equal to that of the cylinder. Flan-
ges attached to these rectangular pieces of plank to limit the opening &
to prevent the ears of corn from falling between the ends of the cylinder
and the sides of the box. Having placed the two rectangular pieces of plank upon the sides of the first described box in such a manner
that the middle of their lower edges (grooved for the purpose) will
be over the shaft of the cylinder this opening of the hopper about
two or three inches above the cylinder. A piece of plank running
from one of the before mentioned rectangular pieces of plank to
the other and firmly fixed - having its inner surface adapted
to a concave cylindrical sheet iron coating attached thereto, is so
inclined as to have this surface parallel to that of the cylinder with
sufficient space between to permit the largest ears of corn to pass
between it and the cylinder. This surface covers one half of the up-
per part of the cylinder except the opening for the hopper. The other
half of the upper part of the cylinder is covered by a piece of board run-
ning from one of the rectangular pieces of plank to the other serving as
a door which opens upward and is kept open while the machine
is in operation. This second box is fixed to the first box by a hook
attached to the outside of each rectangular piece of plank and
may be taken off at pleasure. The cylinder being put in motion
the ears of corn are thrown into the hopper by the hand or by a shovel
and are carried by the motion and the protuberances of the cylinder between
that and the sheet iron coating just mentioned till they fill the space
between the cylinder and the concave cylindrical surface just described.
Compressed between this surface and the cylinder and rolled on by
means of the protuberances in the cylinder and above mentioned ridges in
this concave surface they are shelled as they pass along this space the
kernels falling through the openings in and between the staves of this
concave surface thereby flying out at the opposite side such of them
as would otherwise fly nearly in a vertical direction being turned from
the machine by means of the above mentioned open door. The falling
kernels are caught by two pieces of board placed immediately under
the concave surface and running from one side of the box to the other
being so inclined as to cause the kernels to slide into a trough placed
in the bottom of the box and extending from one side to the other. The
bottom of the trough is a plane so inclined as to cause the kernels to slide out of the box by an opening in the side of the box. This trough
may be taken out of the box and placed within it in such a man
ner as to cause the kernels to pass out at either side of the box at
pleasure — The said Isaac A Hedges claims as his invention
the concave cylindrical surface by a combination of staves with
springs attached as herein described and the application of such sur
face so formed to the purposes of corn shelling and also the application of
such surface to a cylinder for the same purpose

[illegible] Maxwell } Witnesses
Henry V Breese }

Isaac A. Hedges

Ex'd
Ch[illegible]